US006928211B2

(12) United States Patent
Tanigawa et al.

(10) Patent No.: US 6,928,211 B2
(45) Date of Patent: Aug. 9, 2005

(54) OPTICAL FIBER AND OPTICAL TRANSMISSION PATH THAT USES THE OPTICAL FIBER

(75) Inventors: Shoji Tanigawa, Sakura (JP); Shoichiro Matsuo, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 72 days.

(21) Appl. No.: 10/636,552

(22) Filed: Aug. 8, 2003

(65) Prior Publication Data

US 2004/0028363 A1 Feb. 12, 2004

(30) Foreign Application Priority Data

Aug. 9, 2002 (JP) ....................................... 2002-234065
Mar. 14, 2003 (JP) ....................................... 2003-070225

(51) Int. Cl.$^7$ ............................................... G02B 6/02
(52) U.S. Cl. ......................................................... 385/24
(58) Field of Search ................................. 385/123–128

(56) References Cited

FOREIGN PATENT DOCUMENTS

EP    0 789 257 A1    8/1997
EP    1 146 358 A1    10/2001

OTHER PUBLICATIONS

Jun–ichi Sakai et al., "Bending Loss of propagation Modes in Arbitrary–Index Profile Optical Fibers" Applied Optics, Optical Society of America, Washington, U.S., vol. 17, No. 10, May 15, 1978, pp. 1499–1506.
D. Marcuse, "Loss Analysis of Single–Mode Fiber Splices", Bell System Technical Journal, AT&T, Short Hills, NY, U.S., vol. 56, No. 5, May 1977, pp. 703–718.

*Primary Examiner*—Akm Enayet Ullah
*Assistant Examiner*—Jerry T. Rahll
(74) *Attorney, Agent, or Firm*—Sughrue Mion, PLLC

(57) ABSTRACT

There is provided at low cost an optical fiber suitable for wavelength division multiplex transmissions that has strengthened the tolerance to bending loss at even smaller bending diameters. The present invention is an optical fiber whose base material is silica glass and that has a two layer structure formed by a core that has a substantially uniform refractive index and by a cladding that is located outside the core and that has a substantially uniform refractive index, wherein the optical fiber satisfies the following conditions (1) to (3): (1) an outer diameter of the core is in a range of 4 to 8 $\mu$m, and a relative refractive index difference of the core is in a range of 0.4 to 0.8%; (2) chromatic dispersion at a wavelength of 1550 nm is in a range of 2 to 15 ps/nm/km; and (3) effective area at a wavelength of 1550 nm is 40 $\mu$m$^2$ or more.

10 Claims, 5 Drawing Sheets

FIG. 1A
FIG. 1B
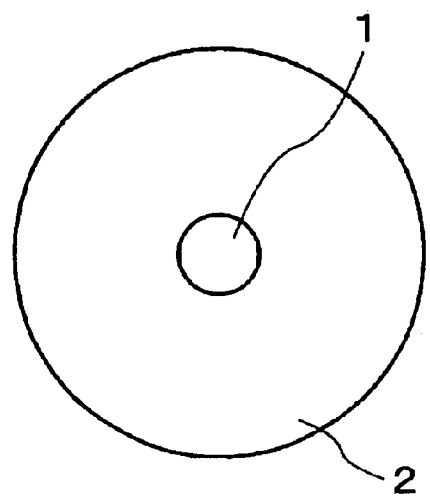
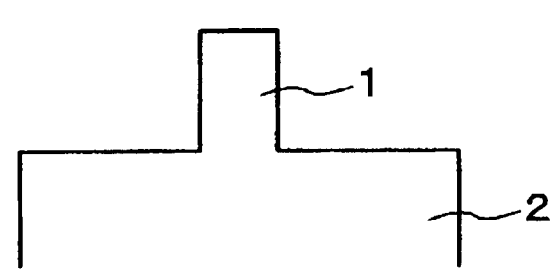
FIG. 2
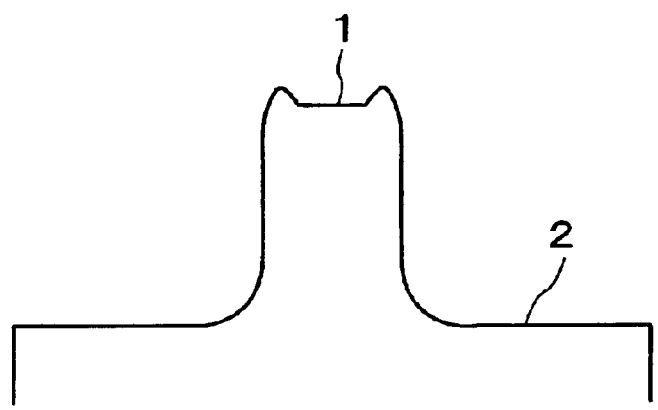

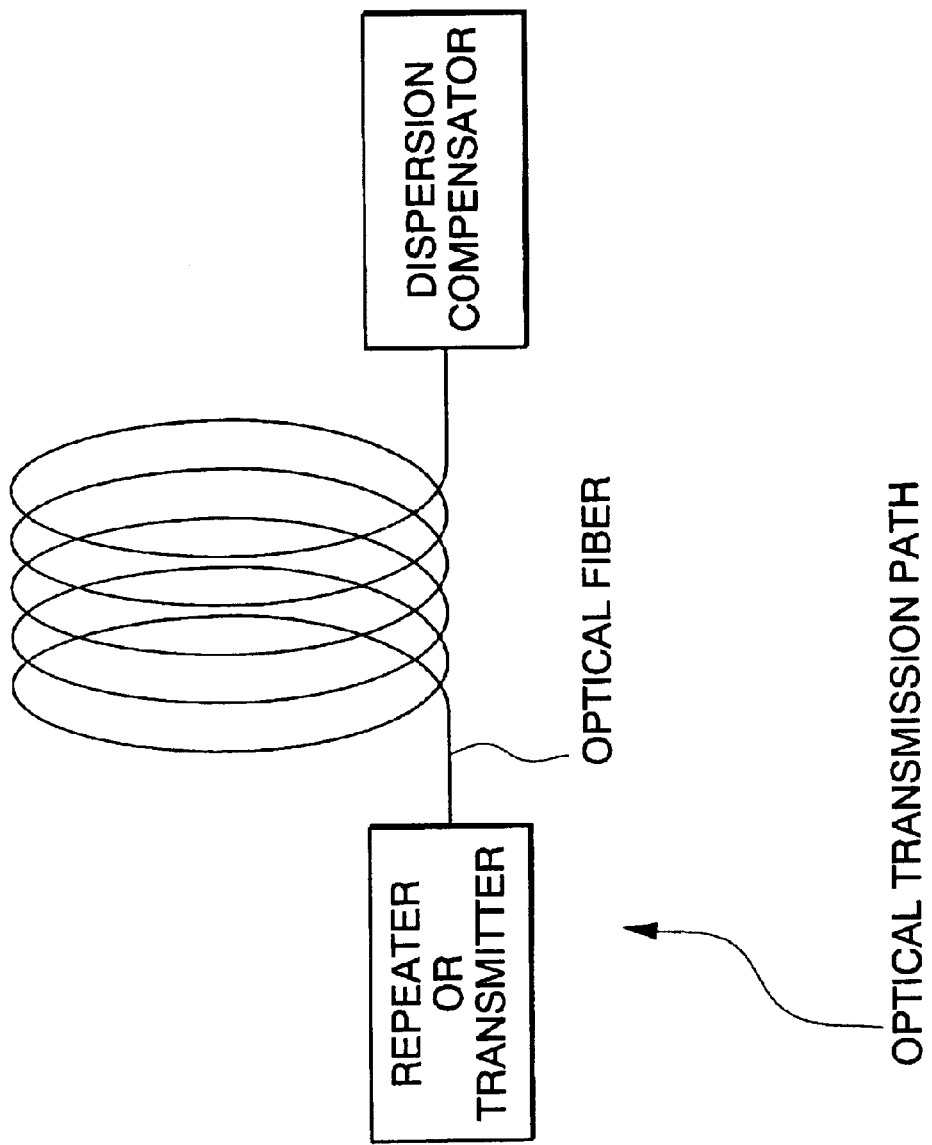

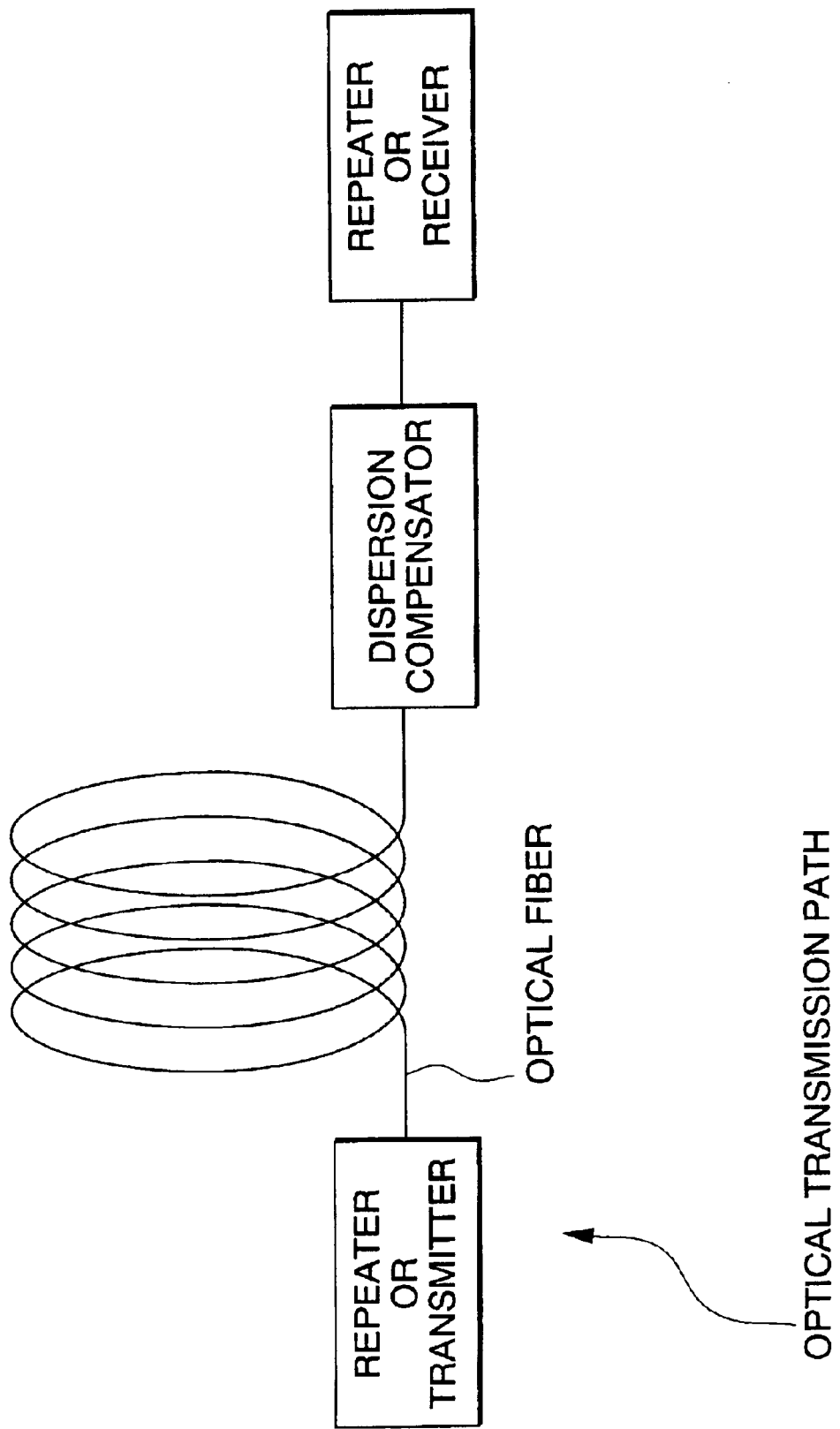

OPTICAL FIBER AND OPTICAL TRANSMISSION PATH THAT USES THE OPTICAL FIBER

Priority is claimed under 35 U.S.C. §119 to Japanese patent application nos. 2002-234065 filed Aug. 9, 2002 and 2003-070225 filed Mar. 14, 2003, both of which are incorporated herein by reference.

BACKGROUND OF THE INVENTION

1. Field of the Invention

The present invention relates to an optical fiber and to a transmission path that uses the optical fiber.

2. Description of the Related Art

Corresponding to increases in the volume of data traffic, increases in the transmission capacity of networks are required.

For example, wavelength division multiplexing (WDM) system is a transmission system which is designed to meet this requirement and is already available commercially.

Moreover, in recent years, investigations have been made into using WDM transmissions not only in long haul systems, but also in metro and access systems.

WDM transmission systems, which are considered applicable to a metro and access system, can be broadly categorized into two types. One type is known as dense WDM (DWDM). This type is almost the same as long haul systems.

The other type is known as coarse WDM (CWDM). This type is a method that spreads each signal wavelength interval uses wide wavelength band.

In WDM transmissions over a relatively short distance (distances up to approximately 200 km may be included in the definition "relatively short distance"), such as in the case with a metro or access system, the system cost is extremely important factor to design the system. As a result, it is necessary for the optical fiber used in such a transmission path to be low in price.

In the case of the installation of optical fiber to private homes and offices (Fiber to the Home—FTTH), in addition to low price, there is another requirement which is required to the fiber for the above described WDM transmission path. Namely, when a fiber is laid in a building or private home, there is a possibility that the optical fiber will be conditioned under extremely small bending of the order of 30 φmm or 20 φmm.

Furthermore, it is extremely important that there is no loss increase even if the fiber is coiled in a small bending diameter in order to store surplus fiber. Therefore, the fiber to the FTTH should be tolerant to the bend.

In contrast, conventionally, several types of optical fiber have been proposed that are suitable for WDM. However, all of them have, for example, three or more layers of complicated refractive index profile and are expensive because of such complicated structure.

Moreover, conventional 1.3 $\mu$m band single mode fibers or multimode fibers are generally used in offices and homes, conventionally. However, these fibers generally only tolerate a bending diameter of approximately 60 mm. Consequently, when the fiber is being laid out careful attention is needed to ensure that there is no excessive bending. Recently, fibers have become commercially available those are based on ITU-T G. 652, which is an international standard for 1.3 $\mu$m band single mode fibers, and tolerate a bending diameter of 30 mm by reducing the size of the mode field diameter (MFD). However, the additional development is awaited of an optical fiber that can cope with still smaller bending diameters for wiring in buildings and private homes.

The present invention was conceived in view of the above circumstances and it is an object thereof to provide a low price optical fiber that is suitable for WDM transmission.

A second object is to provide an optical fiber capable of being laid with a small bending diameter or of allowing surplus fiber thereof to be stored in small diameter.

SUMMARY OF THE INVENTION

In order to clear up the above problems the present inventors decided to investigate whether it was possible to obtain characteristics suitable for WDM transmission using an optical fiber having a refractive index profile as simple as possible.

As a result, the present inventors discovered that it was possible to obtain an optical fiber having optical characteristics suitable for WDM transmission by using what is known as a step index profile with a two layer structure formed by a core and a cladding, which is considered the most simple structure, and has conventionally been considered unsuitable for WDM transmission.

Namely, the first aspect of the present invention is an optical fiber whose base material is silica glass and that has a two layer structure formed by a core that has a substantially uniform first refractive index and by a cladding that is located outside the core and that has a substantially uniform second refractive index, wherein the optical fiber satisfies the following conditions (1) to (3): (1) an outer diameter of the core is in a range of 4 to 8 $\mu$m, and a relative refractive index difference between the first refractive index and second refractive index when second refractive index is taken as a reference, is in a range of 0.4 to 0.8%; (2) chromatic dispersion at a wavelength of 1550 nm is in a range of 2 to 15 ps/nm/km; and (3) effective area at a wavelength of 1550 nm is 40 $\mu m^2$ or more.

The second aspect of the present invention is the optical fiber according to the first aspect, wherein the outer diameter of the core is in a range of 4.5 to 5 $\mu$m, and the chromatic dispersion is in a range of 2 to 6 ps/nm/km.

The third aspect of the present invention is the optical fiber according to the first aspect, wherein the outer diameter of the core is in a range of 5 to 8 $\mu$m, and the chromatic dispersion is in a range of 6 to 15 ps/nm/km.

The fourth aspect of the present invention is the optical fiber according to the third aspect, wherein the outer diameter of the core is in a range of 5 to 6.5 $\mu$m, and the chromatic dispersion is 6 to 10 ps/nm/km.

The fifth aspect of the present invention is the optical fiber according to any of the first through fourth aspects, wherein the relative refractive index difference is in a range of 0.4 to 0.6%, and the effective area is 50 $\mu$m or more.

The sixth aspect of the present invention is the optical fiber according to the third or fourth aspects, wherein the relative refractive index difference is in a range of 0.4 to 0.5%, and the effective area is 60 $\mu m^2$ or more.

The seventh aspect of the present invention is the optical fiber according to any of the first through sixth aspects, wherein transmission loss is 0.35 dB/km or less over a wavelength range from 1360 to 1400 nm.

The eighth aspect of the present invention is the optical fiber according to any of the first through seventh aspects, wherein transmission loss is 0.40 dB/km or less over a wavelength range from 1260 to 1625 nm.

The present inventors also focused on a parameter known as $V_{core}$ and discovered that, by limiting this $V_{core}$, it was possible to suppress chromatic dispersion at a wavelength of 1550 nm.

Namely, the ninth aspect of the present invention is the optical fiber according to the fourth aspect, wherein $V_{core}$ is 15% $\mu m^2$ or less, when $V_{core}$ is obtained by multiplying $\pi$ by a value obtained by integrating the sum of r and $\Delta n$ (r) with r within a range of 0 to $r_{core}$, with $\Delta n$ (r) being the relative refractive index difference, and with $r_{core}$ being the outermost radius of the core at a radius r of the optical fiber.

The tenth aspect of the present invention is the optical fiber according to the ninth aspect, wherein the relative refractive index difference is in a range of 0.4 to 0.6%, and the effective area is 50 $\mu m^2$ or more.

The eleventh aspect of the present invention is the optical fiber according to the third aspect, wherein the relative refractive index difference is in a range of 0.51 to 0.59%, and the core diameter is in a range of 5.5 to 7.0 $\mu m$.

The twelfth aspect of the present invention is the optical fiber according to the eleventh aspect, wherein when the relative refractive index difference is taken as $\Delta$, $V_{core}$ is greater than $(-17.25 \cdot \Delta + 25.2)$ and less than 20% $\mu m^2$.

The thirteenth aspect of the present invention is the optical fiber according to twelfth aspect, wherein the optical fiber has a mode field diameter (MFD) of 7.8 $\mu m$ or greater at a wavelength of 1550 nm, and a bending loss of 0.3 dB/m or less at a bending diameter of 20 mm.

The fourteenth aspect of the present invention is the optical fiber according to thirteenth aspect, wherein connection loss with a normal single mode optical fiber at ITU-T G.652 Recommendation is 0.35 dB or less at a wavelength of 1550 nm.

The fifteenth aspect of the present invention is the optical fiber according to the ninth aspects, wherein transmission loss is 0.35 dB/km or less over a wavelength range from 1360 to 1400 nm.

The sixteenth aspect of the present invention is the optical fiber according to the ninth aspects, wherein transmission loss is 0.40 dB/km or less over a wavelength range from 1260 to 1625 nm.

The seventeenth aspect of the present invention is an optical transmission path comprising any one of the optical fibers as claimed in the first to sixteenth aspects.

The eighteenth aspect of the present invention is the optical transmission path according to the seventeenth aspect further comprising a dispersion compensator that is combined with the optical fiber.

BRIEF DESCRIPTION OF THE DRAWINGS

FIG. 1A is an explanatory diagram showing the refractive index profile of the optical fiber of the present invention, and shows a cross section when a cut is made at a right angle relative to the central axial direction.

FIG. 1B is an explanatory diagram showing the refractive index profile of the optical fiber of the present invention, and shows a refractive index profile seen from the side.

FIG. 2 is an explanatory diagram of an example for showing a state of the refractive index profile of an actually manufactured optical fiber of the present invention.

FIG. 5 is a diagram showing a schematic construction of an embodiment of an optical transmission path.

FIG. 6 is a diagram showing a schematic construction of an embodiment of an optical transmission path with a dispersion compensator.

DESCRIPTION OF THE PREFERRED EMBODIMENTS

Figure 3A:
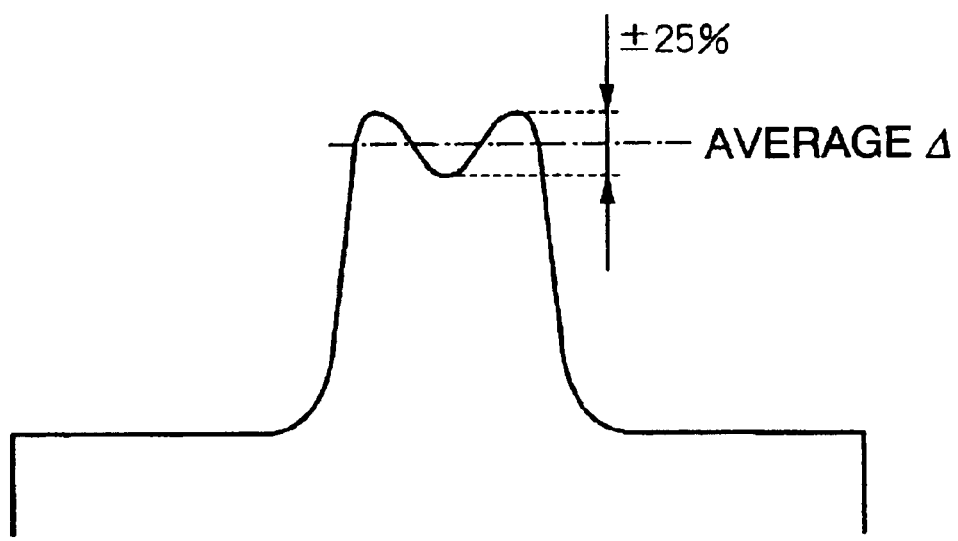
FIG. 3A is an explanatory diagram of an example for showing states of the refractive index profile of an actually manufactured optical fiber of the present invention.

The present invention will now be described in detail.

(The Optical Fiber of the First Aspect of the Present Invention)

FIGS. 1A and 1B show examples of refractive index profile of the optical fiber of the present invention. FIG. 1A shows a cross section when a cut is made at a right angle relative to the central axial direction. FIG. 1B shows a refractive index profile seen from the side.

The descriptor 1 in the drawings is a core. Cladding 2 is provided in a concentrically circular form on the outside of the core 1, and an optical fiber is formed from the two layers of the core 1 and the cladding 2.

The core 1 and the cladding 2 both have substantially uniform refractive indexes, however, the refractive index of the core 1 is higher than that of the cladding 2.

The base material of this optical fiber is silica glass and the materials of the core 1 and cladding 2 are decided based on desirable their refractive indexes. For example, if the core 1 is formed from germanium doped silica glass or the like, the cladding 2 is formed from pure silica glass or from fluorine doped silica glass or the like. If the core 1 is formed from pure silica glass or the like, the cladding 2 is formed from fluorine doped silica glass or the like.

In an optical fiber that has silica glass as the base material, Rayleigh scattering loss is reduced if there is only a small amount of dopant such as germanium and fluorine added thereto. Therefore, it is preferable that only one of the core 1 and the cladding 2 is formed from a material that has dopant added thereto and the other is formed from substantially pure silica glass. Accordingly, it is preferable that, for example, the core 1 is formed from germanium doped silica glass and the cladding 2 is formed from substantially pure silica glass, or that the core 1 is formed from substantially pure silica glass and the cladding 2 is formed from fluorine doped silica glass.

In the meanwhile, important properties those are required to the fibers for WDM systems, and particularly for DWDM systems, are chromatic dispersion, effective area and so on.

At this time, the fibers should be satisfied the characteristics, which are required foran conventional SM fiber, such as the polarization mode dispersion (PMD), cutoff wavelength, and bending loss. Although not particularly restricted, it is preferable that the PMD is 0.1 ps/$\sqrt{km}$ or less, that the cutoff wavelength is a value that allows single mode transmission in the wavelengths used for transmission, and that at least the cutoff wavelength measured at the length which would be in actual use is shorter than the minimum wavelength used for transmission.

The wavelengths used for transmission are users definable, for example, from what is known as the S band, to the C band, and to the L band (1460 nm to 1625 nm). In the optical fiber of the present invention, a value of 1.4 $\mu m$ or less is obtained for the cable cutoff wavelength. Cable cutoff wavelength is described in ITU-T Recommendation G. 650. Moreover, a value of 10 dB/m or less is obtained for the bending loss in measurement conditions of a bending diameter of 20 mm at a wavelength of 1550 nm, for example.

The smaller the absolute value of the chromatic dispersion, the higher the four wave mixing (FWM) efficiency. FWM is a cause of signal distortion in WDM transmission, and particularly, in DWDM. Therefore, the efficiency is preferable to be suppressed.

Because of this, it is desirable that an optical fiber used for WDM has a chromatic dispersion of at least 1 ps/nm/km or more in the wavelength range used for transmission, and preferably a wavelength dispersion of 2 ps/nm/km or more.

On the other hand, if the chromatic dispersion is too large, signal distortion caused by self phase modulation (SPM) and by the dispersion becomes problematic. For example, dispersion compensation becomes necessary which leads to increased costs, or, the transmission distance is limited by the distortion. Therefore, it is desirable that the chromatic dispersion of the optical fiber used for WDM is small.

Because of these two antipodal requirements, in WDM transmission, an optical fiber having an intermediate chromatic dispersion that is not too large and not too small is desirable.

In order to satisfy the above requirements over a wider range, a small dispersion slope over the wavelength range where is used for transmission is desired.

A large effective area (Aeff) is preferred so that non-linear effects such as SPM, FWM, and the like can be suppressed.

The optical fiber of the first aspect of the present invention satisfies the conditions (1) to (3) above, and can satisfy the conditions of chromatic dispersion and effective area required to an optical fiber used in relevant WDM transmissions and, preferably, in DWDM transmissions.

Concerning (1) above, the outer diameter of the core is 4 to 8 $\mu$m. If the outer diameter of the core is less than 4 $\mu$m the chromatic dispersion is too small, as a result the fiber is insufficient for FWM suppression. If the outer diameter of the core exceeds 8 $\mu$m the chromatic dispersion is too big and the transmission characteristics are deteriorated.

The relative refractive index difference of the core 1 is 0.4 to 0.8%. The relative refractive index difference of the core 1 is defined by $(n1^2-n2^2)/2n1^2$ where the refractive index of the core 1 is n1 and the refractive index of the cladding 2 is n2.

If the relative refractive index difference of the core 1 is less than 0.4%, then the bending loss becomes too high when an optical fiber is designed to have the aforementioned intermediate chromatic dispersion and the optical fiber cannot put to actual use. If the relative refractive index difference of the core 1 exceeds 0.8% then the effective area becomes so small as to cause the problematic level of non-linear effect. Note that the relative refractive index difference can be adjusted, for example, by changing the amount of dopant that is doped during manufacturing.

The optical fiber of the present invention can be obtained by selecting a combination of the relative refractive index difference and the core diameter from the range of 4 to 8 $\mu$m in outer diameter of core 1 and the range of 0.4 to 0.8% in relative refractive index difference of core 1 which are the conditions of (1) above, that satisfies the above mentioned optical characteristics of (2) and (3) through simulation. The simulation method may be a technique commonly used by people skilled in the art.

Here, in so-called step index profile, the dispersion slope is known to be substantially constant between approximately 0.05 to 0.06 ps/nm$^2$/km, and this range is favorable because the above described intermediate chromatic dispersion value can be kept over a wide wavelength range. Therefore, the fiber can use in WDM transmissions and, particularly, DWDM transmissions over a wide wavelength range.

Concerning (2) above, if the chromatic dispersion at a wavelength of 1550 nm is 2 ps/nm/km or more then FWM can be suppressed even, for example, within what is known as the C band (1530 to 1565 nm). If the wavelength dispersion at a wavelength of 1550 nm is 15 ps/nm/km or less, then even at an upper limit wavelength (1625 nm) of the L band (1565 to 1625 nm), the chromatic dispersion value is approximately 18 ps/nm/km or less. Therefore the usable wavelength band can be extended to the upper limit value of the L band.

Because the chromatic dispersion at a wavelength of 1550 nm of a conventional single mode optical fiber for 1.3 $\mu$m use is approximately 18 ps/nm/km, from the standpoint of chromatic dispersion, if the optical fiber of the present invention is used, then even if the wavelength range is extended to 1625 nm, transmission characteristics that are substantially the same as for a wavelength of 1550 nm can be obtained, which is preferable from the standpoints of enlarging the applicable wavelength range for wavelength multiplexing.

If the effective area satisfies the range of (3) above (40 $\mu$m$^2$ or more and, essentially, from the standpoint of the limits of other characteristics such as bending loss, as well as in viewpoint of manufacturability, 70 $\mu$m$^2$ or less) then non-linear optical effect can be suppressed and transmission characteristics improved.

Here, usually, the outer diameter of the cladding 2 is set approximately 125 $\mu$m.

One type of an optical fiber provided with a two layer of a core and a cladding (what is known as a step index profile), is conventionally known as, for example, a 1.3 $\mu$m single mode optical fiber. However, heretofore, an optical fiber provided with a step index profile was considered to not be suitable for WDM transmissions and has not attracted attention as an optical fiber for WDM transmissions.

In a conventional optical fiber provided with a step index profile (a 1.3 $\mu$m single mode optical fiber), the outer diameter of the core of the fiber and the relative refractive index difference of it do not satisfy the conditions of (1) above, and it can also not provide such characteristics as shown by (2) and (3). Accordingly, if this type of conventional standard single mode optical fiber for 1.3 $\mu$m is used for WDM transmissions and, in particular, for DWDM transmissions, problems arise such as the transmission distance being limited or the cost of the overall system being raised due to an increased value of chromatic dispersion that needs to be compensated by a dispersion compensator. Consequently, the structure and effects of a conventional standard single mode optical fiber for 1.3 $\mu$m and the optical fiber of the present invention are completely different.

(The Optical Fiber of the Second Aspect of the Present Invention)

The optical fiber of the second aspect of the present invention is the optical fiber of the first aspect of the present invention in which the outer diameter of the core 1 is set to within a range of 4.5 to 5 $\mu$m, thereby enabling chromatic dispersion at a wavelength of 1550 nm to be set in a range of 2 to 6 ps/nm/km. This allows transmission loss to be reduced, and enables transmission characteristics to be improved.

Moreover, because the wavelength dispersion value in the L bands can be suppressed this gives the advantage of being good transmission characteristics in the L band.

If chromatic dispersion at a wavelength of 1550 nm is 6 ps/nm/km, for example, in the C band 10 G transmission is possible over a distance of 100 km or more without dispersion compensation.

Accordingly, it is preferable that the optical fiber of the second aspect of the present invention is used in a wavelength band selected from the C to L bands.

(The Optical Fiber of the Third Aspect of the Present Invention)

The optical fiber of the third aspect of the present invention is the optical fiber of the first aspect of the present invention in which the outer diameter of the core 1 is set to within a range of 5 to 8 μm, thereby enabling chromatic dispersion at a wavelength of 1550 nm to be set in a range of 6 to 15 ps/nm/km.

Because of such characteristics, it is possible to suppress FWM in a shorter wavelength region, namely, in what is known as the S band (1460 to 1530 nm). If the diameter of the core 1 is less than 5 μm, chromatic dispersion in the S band is decreased and it is not possible to suppress FWM.

If chromatic dispersion at a wavelength of 1550 nm is 6 ps/nm/km, a high chromatic dispersion (preferably approximately 1 ps/nm/km or more) that makes it possible to suppress FWM is assured even, for example, at the lower limit wavelength (1460 nm) of the S band.

Accordingly, it is preferable that the optical fiber of the third aspect of the present invention is used in a wavelength band selected from the S to C bands.

(The Optical Fiber of the Fourth Aspect of the Present Invention)

The optical fiber of the fourth aspect of the present invention is the optical fiber of the third aspect of the present invention in which the outer diameter of the core 1 is further set to within a range of 5 to 6.5 μm, thereby enabling chromatic dispersion at a wavelength of 1550 m to be set in a range of 6 to 10 ps/nm/km.

The optical fiber of the fourth aspect of the present invention is suitable for use in the S band and further reduces the upper limit value of the chromatic dispersion while simultaneously improving transmission characteristics in the L band.

Accordingly, it is preferable that the optical fiber of the fourth aspect of the present invention is used in a wavelength band selected from the S to C to L bands.

(The Optical Fiber of the Fifth Aspect of the Present Invention)

The optical fiber of the fifth aspect of the present invention is the optical fiber of any of the first through fourth aspects in which the relative refractive index difference of the core 1 is set to within a range of 0.4 to 0.6%, thereby enabling the effective area at a wavelength of 1550 nm to be set to 50 $\mu m^2$ or more (essentially, from the standpoint of the limits of other characteristics such as bending loss, as well as in view of manufacturability, 70 $\mu m^2$ or less). As a result, the effect of non-linear optical effect is further suppressed.

(The Optical Fiber of the Sixth Aspect of the Present Invention)

The optical fiber of the sixth aspect of the present invention is the optical fiber of the fifth aspect in which the relative refractive index difference of the core 1 is set to 0.4 to 0.5%, thereby enabling the effective area to be set to 60 $\mu m^2$ or more (essentially, from the standpoint of the limits of other characteristics such as bending loss, as well as in view of manufacturability, 70 $\mu m^2$ or less). As a result, the effect of non-linear optical effect is further suppressed.

At this time, it is preferable adjusting to be made such that the chromatic dispersion is in the range of 6 to 15 ps/nm/km. If the conditions are satisfied with the chromatic dispersion in a range of 2 ps/nm/km or more and less than 6 ps/nm/km, at a wavelength of 1550 nm, bending loss at a bending diameter of 20 mm tends to increase, for example, to 40 dB/m or more, therefore, the fiber can not put to actual use.

(The Optical Fiber of the Seventh Aspect of the Present Invention)

One of required characteristics for the fiber for CWDM transmission is low transmission loss over a wide wavelength region because of the fact that an optical amplifier does not use in CWDM transmission.

The optical fiber of the seventh aspect of the present invention is the optical fiber of any of the first through sixth aspects in which transmission loss over the wavelength range from 1360 to 1400 nm is 0.35 dB or less and, preferably, 0.32 dB or less. Accordingly, this optical fiber can be used in any WDM transmission (including CWDM and DWDM transmissions).

Because an absorption peak caused by Si—OH bonds formed within the silica glass (in the vicinity of 1380 nm) is present, it is known that transmission loss becomes worse within this wavelength range. Si—OH bonds are formed by OH group contamination during the optical fiber manufacturing process. They can be removed to a certain extent, for example, by using a dehydrating agent. Because, however, it is not possible to remove them completely, it is desirable that OH group contamination be held to as low a level as possible.

If a conventional optical fiber for WDM having a complicated refractive index profile is used, as the manufacturing process increases to make such complicated profile, there is increased opportunity for OH group contamination to be pitched during the optical fiber manufacturing process, as a result, it is difficult to sufficiently reduce absorption caused by Si—OH bonds.

However, because the optical fiber of the present invention has a simple refractive index profile, it is relatively easy to prevent Si—OH bonds being formed in the optical fiber during the manufacturing process. As a result, low transmission loss is obtained across the 1360 to 1400 nm wavelength range as is described above.

(The Optical Fiber of the Eighth Aspect of the Present Invention)

The core 1 of the optical fiber of the present invention has a low relative refractive index difference compared with conventional optical fibers for WDM transmission that have a complicated refractive index profile. Therefore, in the case of the optical fiber of the present invention, the amounts of dopants such as germanium and fluorine that are doped can be reduced. This enables Rayleigh scattering loss to be reduced.

The amount of dopant and the like is appropriately adjusted in accordance with the design, manufacturing conditions and the like. For example, if the core 1 is formed from germanium doped silica glass and the cladding 2 is formed from pure silica glass, the amount of doped germanium may be, for example, 4.0 to 7.5 mol % in germanium oxide equivalent weight (equivalent to a relative refractive index difference of 0.4 to 0.8%).

Moreover, in addition to the effect of being able to reduce optical absorption caused by the aforementioned Si—OH bonds, an optical fiber having a transmission loss of 0.40 dB/km or less and preferably 0.36 dB/km or less over the 1260 to 1625 nm wavelength range can be obtained.

If an optical fiber is actually manufactured based on an ideal refractive index profile design such as shown in FIGS. 1A and 1B using a conventionally known method such as the MCVD, OVD, or VAD methods, for example, "sagging" or "horns" in the refractive index may be generated in the core 1, as is shown in the example in FIG. 2, which is caused by fluctuations and the like during manufacturing in some cases.

However, essentially, these do not particularly pose problems if the value of (1) above is satisfied in an equivalent manner. For example, in an actually manufactured optical fiber it is sufficient if a value obtained by averaging values of refractive index and the like of the core satisfies the refractive index profile conditions of the ideal refractive index profile.

As described above, an example of the term "provided that, essentially, the design condition for (1) above is satisfied in an equivalent manner" is given in the following case.

Firstly, possible examples for the relative refractive index of the core are given below. (a) A case when, in an actually manufactured optical fiber, the average value of the refractive index of the core thereof satisfies refractive index profile conditions of an ideal refractive index profile (a step refractive index profile) described in (1) above, and also the optical characteristics of the optical fiber satisfy optical characteristics such as those described above. (b) It is sufficient if, essentially, the refractive index profile is unimodal. This includes all cases other than those in which the refractive index profile is intentionally formed as not unimodal.

Figure 3B:
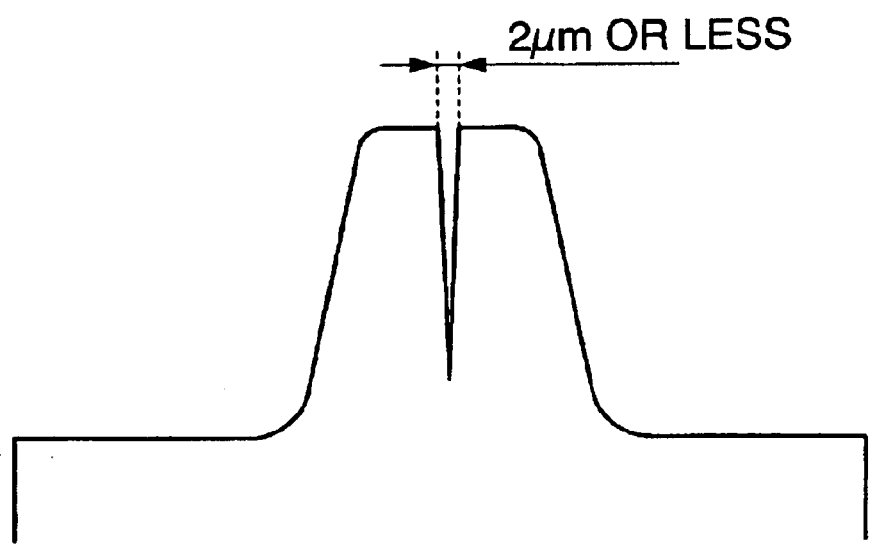
FIG. 3B is an explanatory diagram of an example for showing states of the refractive index profile of an actually manufactured optical fiber of the present invention.

Examples of this include: as is shown in FIG. 3A, cases in which the average value of the core refractive index satisfies the refractive index profile conditions described in (1) above, and fluctuations in the core refractive index are within ±25% of the average value of the core refractive index; and, as is shown in FIG. 3B, cases in which the average value of the core refractive index satisfies the refractive index profile conditions described in (1) above, and there is an abrupt fluctuation in the refractive index within a diametrical range of 2 μm from the core center (a core refractive index having an unintentional fluctuation that appears when a collapsing is being performed in the MCVD and PCVD methods).

For the outer diameter of the core, an average value is calculated for the core refractive index and, in an ideal refractive index profile (a step refractive index profile) for this average value, the outer diameter is acceptable if it is within the numerical range for the core outer diameter described in (1) above, and also if the optical characteristics are satisfied. Essentially, for example, in the actual refractive index profile, the outer diameter is acceptable if a range having a refractive index of 20 to 80% of the average value of the core refractive index is within the range of the core outer diameter described in (1) above.

Here, the optical fiber of the present invention can be manufactured using a conventional known method.

(The Optical Fiber of the Ninth Aspect of the Present Invention)

In the optical fiber of the above described first to eighth aspects, a profile of an optical fiber that provides optical characteristics appropriate for WDM transmission (an Aeff of approximately 50 μm² at intermediate dispersion) while having a simple structure (a step profile) is mentioned.

In the optical fiber of the above described first to eighth aspects of the present invention the refractive index is stipulated using the parameters of the core diameter and the core relative refractive index difference. In contrast, the optical fiber of the ninth aspect of the present invention a parameter called a $V_{core}$ is introduced to the optical fiber of the fourth aspect, and it is made clear that an optical fiber having a chromatic dispersion of 10 ps/nm/km can be obtained by defining the relationship between the core diameter and the relative refractive index difference and by setting $V_{core}$ to 15% μm² or less.

The parameter known as $V_{core}$ is defined by Formula (1). The unit thereof is % μm². Here, Δn (r) is the relative refractive index difference at the radius r when the refractive index of the cladding of the optical fiber is taken as a reference, and $r_{core}$ is the outermost radius of the core.

$$V_{core} = \pi \int_0^{r_{core}} \Delta_n(r) \cdot r \, dr \qquad (1)$$

Namely, $V_{core}$ can be obtained by multiplying π by a value obtained by integrating the sum of r and Δn (r) with r in a range of 0 to $r_{core}$.

By limiting $V_{core}$ represented by Formula (1) to 15% μm² or less, it is possible to suppress the chromatic dispersion at a wavelength of 1550 nm to +10 ps/nm/km or less. This relationship is also particularly effective in the case of refractive index profiles which have sagging or horns in the refractive index profile, as is shown in FIGS. 2 and 3.

(The Optical Fiber of the Tenth Aspect of the Present Invention)

The optical fiber of the tenth aspect of the present invention is the optical fiber of ninth aspect in which the relative refractive index difference of the core 1 is set to within a range of 0.4 to 0.6%, thereby enabling the effective area at a wavelength of 1550 nm to be set to 50 μm² or more (essentially, from the standpoint of the limits of other characteristics such as bending loss, as well as in view of manufacturability, 70 μm² or less). As a result, the effect of non-linear optical effect is further suppressed.

(The Optical Fiber of the Eleventh Aspect of the Present Invention)

The optical fiber of the eleventh aspect of the present invention is furnished with a mode field diameter of 7.8 μm or more, a cutoff wavelength of 1.26 μm or less, and also a bending loss of 0.3 dB/m or less at 20 φmm by setting the relative refractive index difference of the core 1 of the optical fiber of the third aspect of the present invention in a range between 0.51 and 0.59% and by also setting the core diameter thereof in a range between 5.5 and 7.0 μm. As a result, it is possible to strengthen the tolerance to bending loss in a small bending diameter in comparison with a conventional single mode fiber for the 1.3 μm band. Consequently, an optical fiber is obtained that can be laid with a small bend diameter or whose surplus fiber can be stored in a small diameter, which are features sought in an office or in the home.

If the relative refractive difference Δ is 0.51% or less it is not possible to achieve both an λc of 1.26 μm or less and a bending loss of 0.3 dB/m or less. In optical transmission, the wavelength band between 1.26 and 1.625 μm is widely used as a transmission band, and a cutoff wavelength of 1.26 μm or less is necessary from the viewpoint of applicability to CWDM transmission systems.

In addition, if the relative refractive difference Δ is 0.59% or more, the MFD at a wavelength of 1550 nm goes below 7.8 μm. If the MFD goes below 7.8 μm then problems arise regarding the connectivity with conventional single mode optical fibers recommended in ITU-T G. 652. Conventional single mode optical fibers are widely used for transmission, and the nominal value of the MFD in ITU-T G.652 is restricted to 8.6 to 9.5 µm at 1310 nm. A conventional single mode optical fiber having an MFD of approximately 9.2 µm at 1310 nm has an MFD of approximately 10.4 µm at 1550 nm. Therefore, as described above, if the MFD goes below 7.8 µm there is a concern that connection loss with a conventional single mode optical fiber will exceed 0.35 dB.

Such increase in connection loss is undesirable as it causes a reduction in the loss margin of a designed system. For example, in the General Conference of the Institute of Electronic, Information and Communication Engineers B-10-29 for the year 2000, investigations were made into an optical fiber for laying indoors that was resistant to bending. According to these investigations, a dispersion shift optical fiber (referred to below as Recommendation ITU-T G.653) is excellent with regard to bend characteristics, however, connection loss with a conventional single mode optical fiber is approximately 0.55 dB at a wavelength of 1550 nm, and approximately 0.87 dB at a wavelength of 1310 nm, which, it was indicated, is problematic.

In contrast to this, the optical fiber of the present invention is desirable because a connection loss of 0.35 dB or less could be obtained in approximately half the results of the above investigation, which solves the above described practical problems.

(The Optical Fiber of the Twelfth Aspect of the Present Invention).

The optical fiber of the twelfth aspect of the present invention is the optical fiber of the eleventh aspect in which $V_{core}$ is set greater than $(-17.25 \cdot \Delta + 25.2)$ and less than 20% µg m² when the relative refractive index difference is $\Delta$. Namely, this relationship is shown by Formula (2).

$$-17.25 \times \Delta + 25.2 < V_{core} < 20 \qquad (2)$$

The relationship shown in Formula (2) is a relational expression determined from results of the Examples described below. $V_{core}$ and $\Delta$ both satisfy the above Formula (2) in the above described optical fiber of the eleventh aspect. This fact is also necessary to obtain a bending loss of 0.3 dB/m or less. If the $V_{core}$ exceeds 20% µm² then it becomes difficult to achieve λc of 1.26 µm or less.

(The Optical Fiber of the Thirteenth Aspect of the Present Invention).

The optical fiber of the thirteenth aspect of the present invention is the optical fiber of the twelfth aspect in which the mode field diameter (MFD) at a wavelength of 1550 nm is set to 7.8 µm or more, and the bending loss at a bending diameter of 20 mm is set to 0.3 dB/m or less.

According to this aspect, as described above, the optical fiber of the thirteenth aspect of the present invention has a mode field diameter MFD at a wavelength of 1550 nm of 7.8 µm or more. Therefore, when the optical fiber of the thirteenth aspect is connected to a conventional single mode optical fiber, it is possible to keep connectability at the excellent level of 0.35 dB or less. Moreover, by setting the bending loss at a bending diameter of 20 mm to 0.3 dB/m or less it is possible to keep any increase in loss to an extremely small level even if the fiber is bent at 20 φmm. As a result, the optical fiber of the thirteenth aspect has excellent characteristics for applications such as indoor wiring, in whiche a small tolerable bending diameter is sought after.

(The Optical Fiber of the Fourteenth Aspect of the Present Invention).

The optical fiber of the fourteenth aspect of the present invention is the optical fiber according to the thirteenth aspect in which connection loss at a wavelength of 1550 nm is 0.3 dB or less.

Typical examples of connection loss in optical fibers can be found in the paper "Loss Analysis of Single Mode Fiber Splices", Bell Syst. Tech. J., Vol. 56, No. 5, P. 703, May 1997 by D. Marcuse. In this publication connection loss in optical fibers having different mode field diameters (MFD) is defined using Formula (3) below. Here, Tg is connection loss, $2w_1$ and $2w_2$ are the mode field diameters of each optical fiber being connected, and d is the amount of axial misalignment.

$$T_g = \left(\frac{2w_1 w_2}{w_1^2 + w_2^2}\right)^2 \exp\left(-\frac{2d^2}{w_1^2 + w_2^2}\right) \qquad (3)$$

If an ideal connection with no axial misalignment is supposed, Formula (3) above can be abbreviated to Formula (4) below.

$$T_g = \left(\frac{2w_1 w_2}{w_1^2 + w_2^2}\right)^2 \qquad (4)$$

Figure 4:
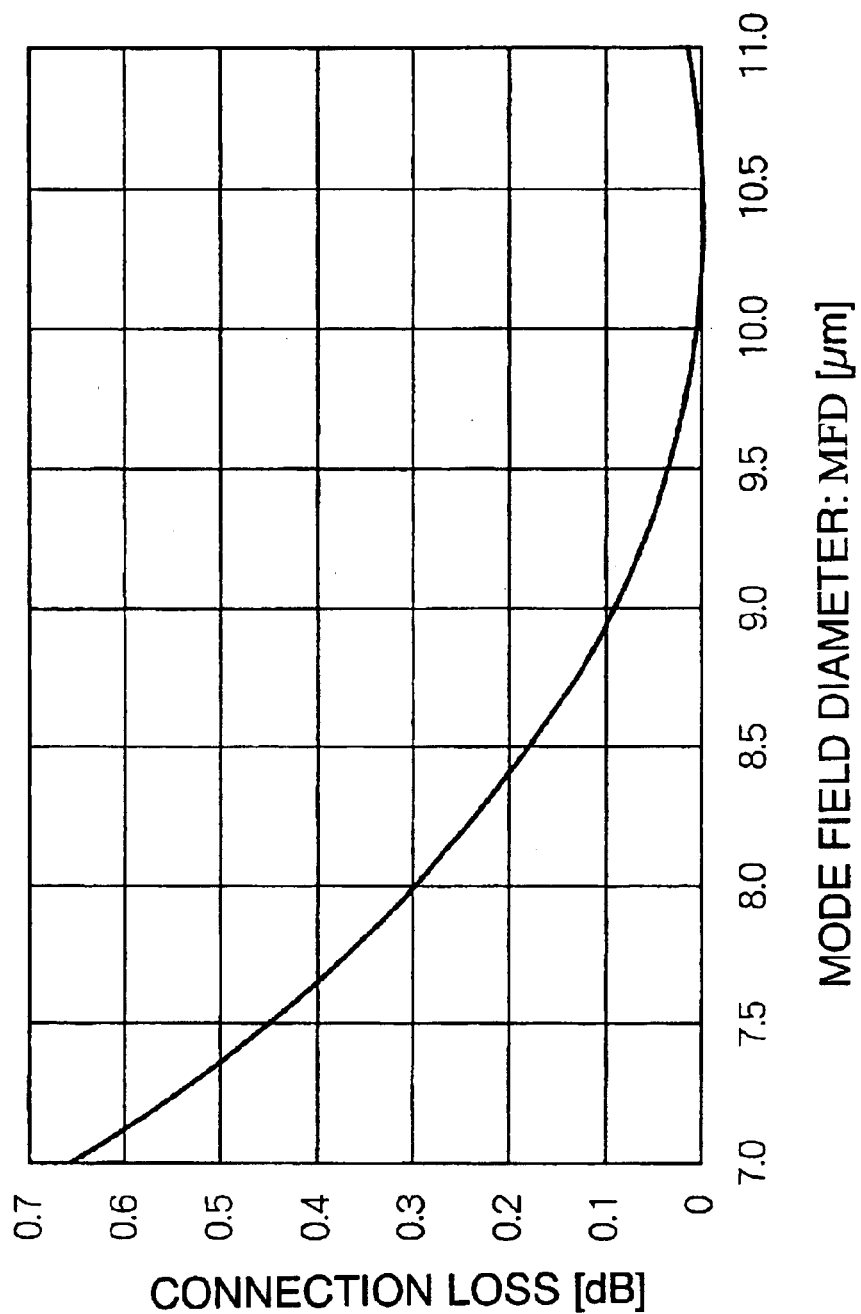
FIG. 4 is a graph showing a relationship between optical fiber connection loss and mode field diameter (MFD) at a wavelength of 1550 nm.

The MFD at 1550 nm of a conventional single mode optical fiber recommended in ITU-T G. 652 recommendation is approximately 10.4 µm. FIG. 4 shows the results when the MFD ($=2w_1$) dependency of the connection loss for a conventional single mode optical fiber ($2w_2$=10.4 µm) is calculated using Formula (4). From FIG. 4 it can be seen that the connection loss increases as the MFD) difference relative to a conventional single mode optical fiber increases.

In contrast to this, as is shown by the thirteenth aspect, the optical fiber of the present invention has an MFD of 7.8 µm or more at a wavelength of 1550 nm. Consequently, the connection loss with a conventional single mode optical fiber at ITU-T G. 652 recommendation is 0.35 dB or less at a wavelength of 1550 nm, which is extremely desirable for practical applications.

(The Optical Fiber of the Fifteenth Aspect of the Present Invention).

One of required characteristics for the fiber for CWDM transmission is low transmission loss over a wide wavelength region because of the fact that an optical amplifier does not use in CWDM transmission.

The optical fiber of the fifteenth aspect of the present invention is the optical fiber of ninth aspect in which transmission loss over the wavelength range from 1360 to 1400 nm is 0.35 dB or less and, preferably, 0.32 dB or less. Accordingly, this optical fiber can be used in any WDM transmission (including CWDM and DWDM transmissions).

(The Optical Fiber of the Sixteenth Aspect of the Present Invention).

The optical fiber of the fifteenth aspect of the present invention is the optical fiber of ninth aspect having a transmission loss of 0.40 dB/km or less and preferably 0.36 dB/km or less over the 1260 to 1625 nm wavelength range.

(The Optical Transmission Path (the Seventeenth and Eighteenth Aspects of the Present Invention))

The seventeenth aspect of the present invention is an optical transmission path that comprises the optical fiber of any of the first through sixteenth aspects.

FIG. 5 is a diagram showing a schematic construction of an embodiment of the optical transmission path.

If the optical fiber of the present invention is used an optical transmission path for WDM (including CWDM and DWDM) transmissions can be provided at low cost.

In this optical transmission path, it is possible to use a dispersion compensator that compensates chromatic dispersion of the optical fiber of the present invention. Employing this aspect is preferable as it enables transmission loss to be reduced even further.

FIG. 6 is a diagram showing a schematic construction of an embodiment of the optical transmission path with a dispersion compensator.

The construction of the dispersion compensator is not particularly restricted. For example, it is sufficient if a dispersion compensating fiber is inserted into a location on the transmission path. It is also possible to employ a module type of dispersion compensator or the like that uses fiber grating or a dispersion compensating optical fiber or the like. Moreover, especially, a module type of dispersion compensator that can also compensate a dispersion slope (known as a dispersion slope compensating type) is preferable. It is also possible, for example, to install dispersion compensators suitable for each of the S, C, and L bands.

Moreover, it is also possible, for example, to install optical amplifier(s) before or (and) after the dispersion compensator.

The value of the chromatic dispersion after it has been compensated by a dispersion compensator can be adjusted, for example, by altering the length of the dispersion compensation optical fiber or by altering the value of the chromatic dispersion for each unit when a dispersion compensation optical fiber is used, and it is preferable that a dispersion compensator is used that compensates the chromatic dispersion within the wavelength region that is used to in a range of −1 to 1 ps/nm/km, and more preferably to in a range of −0.2 to 0.2 ps/nm/km.

In the present invention, because it is possible in this manner to use a simple refractive index profile, control of the structural parameters and the like during the manufacturing process is simplified, therefore, the production yield can be improved. It is also possible to perform use a comparatively simple manufacturing apparatus because of its simple refractive index profile.

EXAMPLES

The present invention will now be described in detail with examples given.

Optical fibers having a two layer structure formed by a core and a cladding in which the outer diameter of the core (denoted in the tables as "Core Diameter") and the relative refractive index difference of the core (denoted in the tables as "Relative Refractive Index Difference") are shown in TABLES 1 to 3 were manufactured using a VAD method. The cores were formed from germanium doped silica glass while the claddings were formed from substantively pure silica glass.

The optical characteristics of the manufactured optical fibers have been shown in TABLES 1 to 3. Here, unless it is noted otherwise, the measured values were measured at a wavelength of 1550 nm. The $V_{core}$ shown in TABLES 1 to 3 is the $V_{core}$ defined by Formula (1) above.

TABLE 1

| Property (Unit) | Example | | | | | | |
|---|---|---|---|---|---|---|---|
| | 1 | 2 | 3 | 4 | 5 | 6 | 7 |
| Core Diameter ($\mu$m) | 5.4 | 4.9 | 5.5 | 6.4 | 5.1 | 5.9 | 7.0 |
| Relative Refractive Index Difference Δ (%) | 0.62 | 0.66 | 0.52 | 0.50 | 0.55 | 0.44 | 0.44 |
| $V_{core}$ (% $\mu$m$^2$) | 14.20 | 12.45 | 12.35 | 16.08 | 11.24 | 12.03 | 16.93 |
| Chromatic Dispersion (ps/nm/km) | 8.1 | 4.0 | 7.3 | 12.8 | 3.9 | 9.5 | 13.9 |
| Chromatic Dispersion Slope (ps/nm$^2$/km) | 0.054 | 0.054 | 0.056 | 0.056 | 0.057 | 0.057 | 0.057 |
| Effective Area Aeff ($\mu$m$^2$) | 42.8 | 40.4 | 51.4 | 53.6 | 50.3 | 61.4 | 61.5 |
| Bending Loss (dB/m)@ 20 $\phi$mm | 0.5 | 0.8 | 3.1 | 0.7 | 4.2 | 6.4 | 0.8 |
| Cutoff Wavelength ($\mu$m) @ ITU-T G. 650 | 1.07 | 1.04 | 1.05 | 1.11 | 1.25 | 1.01 | 1.15 |
| PMD (ps/√km) | 0.03 | 0.02 | 0.01 | 0.04 | 0.04 | 0.01 | 0.02 |
| Transmission Loss (dB/km) @ 1550 nm | 0.192 | 0.197 | 0.191 | 0.189 | 0.193 | 0.186 | 0.188 |
| Transmission Loss (dB/km) @ max 1360 nm to 1550 nm | 0.32 | 0.33 | 0.30 | 0.34 | 0.35 | 0.30 | 0.29 |
| Transmission Loss (dB/km) @ max 1260 nm to 1625 nm | 0.39 | 0.38 | 0.36 | 0.37 | 0.39 | 0.37 | 0.36 |

TABLE 2

| Property (Unit) | Example 8 | 9 | 10 | 11 | 12 | 13 | 14 |
|---|---|---|---|---|---|---|---|
| Core Diameter ($\mu$m) | 6.9 | 6.9 | 6.6 | 6.8 | 6.5 | 6.4 | 6.6 |
| Relative Refractive Index Difference $\Delta$ (%) | 0.51 | 0.52 | 0.52 | 0.54 | 0.54 | 0.54 | 0.56 |
| $V_{core}$ (% $\mu m^2$) | 19.1 | 19.3 | 18.0 | 19.4 | 18.0 | 17.1 | 19.0 |
| Chromatic Dispersion (ps/nm/km) | 14.1 | 14.1 | 13.3 | 13.9 | 12.9 | 12.3 | 13.3 |
| Chromatic Dispersion Slope (ps/nm$^2$/km) | 0.057 | 0.057 | 0.056 | 0.056 | 0.056 | 0.056 | 0.056 |
| Effective Area Aeff ($\mu m^2$) | 53.31 | 53.39 | 52.54 | 51.53 | 50.57 | 50.09 | 49.35 |
| Mode Field Diameter MFD ($\mu$m) | 8.42 | 8.34 | 8.30 | 8.19 | 8.14 | 8.12 | 8.03 |
| Bending Loss (dB/m)@ 20 $\phi$mm | 0.20 | 0.12 | 0.26 | 0.05 | 0.16 | 0.24 | 0.04 |
| Cutoff Wavelength ($\mu$m) @ ITU-T G. 650 | 1.24 | 1.25 | 1.21 | 1.26 | 1.21 | 1.18 | 1.25 |
| PMD (ps/√km) | 0.03 | 0.04 | 0.03 | 0.05 | 0.01 | 0.03 | 0.03 |
| Transmission Loss (dB/km) @ 1550 nm | 0.189 | 0.192 | 0.191 | 0.191 | 0.189 | 0.191 | 0.190 |
| Transmission Loss (dB/km) @ max 1360 nm to 1550 nm | 0.32 | 0.33 | 0.33 | 0.32 | 0.33 | 0.32 | 0.33 |
| Transmission Loss (dB/km) @ max 1260 nm to 1625 nm | 0.38 | 0.39 | 0.38 | 0.37 | 0.37 | 0.38 | 0.36 |

TABLE 3

| Property (Unit) | Example 15 | 16 | 17 | 18 | 19 | 20 |
|---|---|---|---|---|---|---|
| Core Diameter ($\mu$m) | 6.4 | 6.1 | 6.5 | 6.3 | 5.9 | 6.3 |
| Relative Refractive Index Difference $\Delta$ (%) | 0.56 | 0.56 | 0.58 | 0.58 | 0.58 | 0.59 |
| $V_{core}$ (% $\mu m^2$) | 18.0 | 16.2 | 19.3 | 18.0 | 15.6 | 18.4 |
| Chromatic Dispersion (ps/nm/km) | 12.6 | 11.1 | 13.2 | 12.3 | 10.2 | 12.5 |
| Chromatic Dispersion Slope (ps/nm$^2$/km) | 0.055 | 0.055 | 0.056 | 0.055 | 0.055 | 0.051 |
| Effective Area Aeff ($\mu m^2$) | 48.75 | 47.86 | 47.83 | 47.05 | 46.00 | 46.49 |
| Mode Field Diameter MFD ($\mu$m) | 7.99 | 7.95 | 7.90 | 7.85 | 7.81 | 7.80 |
| Bending Loss (dB/m)@ 20 $\phi$mm | 0.08 | 0.28 | 0.01 | 0.04 | 0.27 | 0.02 |
| Cutoff Wavelength ($\mu$m) @ ITU-T G. 650 | 1.21 | 1.15 | 1.26 | 1.21 | 1.13 | 1.23 |
| PMD (psk/√km) | 0.04 | 0.05 | 0.03 | 0.02 | 0.02 | 0.03 |
| Transmission Loss (dB/km) @ 1550 nm | 0.193 | 0.192 | 0.190 | 0.192 | 0.193 | 0.192 |
| Transmission Loss (dB/km)@ max 1360 nm to 1550 nm | 0.34 | 0.33 | 0.31 | 0.32 | 0.32 | 0.34 |
| Transmission Loss (dB/km)@ max 1260 nm to 1625 nm | 0.37 | 0.37 | 0.39 | 0.38 | 0.38 | 0.37 |

TABLE 4

| Property (Unit) | Example 21 | 22 | 23 |
|---|---|---|---|
| Core Diameter ($\mu$m) | 6.5 | 7.5 | 7.5 |
| Relative Refractive Index Difference $\Delta$ (%) | 0.50 | 0.50 | 0.46 |
| $V_{core}$ (% m$^2$) | 16.6 | 22.1 | 20.3 |
| Chromatic Dispersion (ps/nm/km) | 12.7 | 15.7 | 15.6 |
| Chromatic Dispersion Slope (ps/nm$^2$/km) | 0.056 | 0.057 | 0.058 |
| Effective Area Aeff ($\mu m^2$) | 53.93 | 57.66 | 61.56 |
| Mode Field Diameter MFD ($\mu$m) | 8.43 | 8.62 | 8.93 |
| Bending Loss (dB/m) @ 20 $\phi$mm | 1.06 | 0.06 | 0.46 |
| Cutoff Wavelength ($\mu$m) @ ITU-T G. 650 | 1.17 | 1.33 | 1.28 |

TABLE 4-continued

| Property (Unit) | Example | | |
|---|---|---|---|
| | 21 | 22 | 23 |
| PMD (ps/√km) | 0.02 | 0.03 | 0.03 |
| Transmission Loss (dB/km) @ 1550 nm | 0.189 | 0.191 | 0.190 |
| Transmission Loss (dB/km) @ max 1360 nm to 1550 nm | 0.33 | 0.35 | 0.34 |
| Transmission Loss (dB/km) @ max 1260 nm to 1625 nm | 0.38 | 0.39 | 0.39 |

Each of the optical fibers shown in TABLES 1 to 3 has a chromatic dispersion at a wavelength of 1550 nm in a range of 2 to 15 ps/nm/km and an effective area at a wavelength of 1550 nm of 40 μm² or more, and is thereby suitable for use in WDM transmissions.

Furthermore, by comparing Examples 1, 2, 3, 5, and 6 in TABLE 1 with the other examples it can be seen that chromatic dispersion at a wavelength of 1550 nm can be restricted to +10 ps/nm/km or less by limiting the $V_{core}$ to 15% μm² or less.

Moreover, as is clear from the other examples (excepting Examples 21 to 23), by setting the relative refractive index difference of the core 1 to between 0.51 to 0.59%, and by also setting the core diameter to between 5.5 to 7.0 μm, it is possible to obtain a fiber having a mode field diameter of 7.8 μm or more and a cutoff wavelength of 1.26 μm or less as well as having a bending loss at 20 φmm of 0.3 dB/m or less.

In contrast, Examples 21 to 23 in TABLE 4 show cases in which both the relative refractive index difference and the core diameter are outside the above described ranges. The example show that it is not possible to obtain a fiber that simultaneously has a cutoff wavelength of 1.26 φm or less as well as a bending loss at 20 μmm of 0.3 dB/m or less.

As has been described above, in the present invention, because it is possible to use a simple refractive index profile, it is possible to provide at low cost an optical fiber suitable for WDM transmissions and a transmission path that uses this optical fiber.

Moreover, by limiting the $V_{core}$ of the present invention to 15% μm² or fewer, not only can the above described cost reduction be achieved, but an optical fiber can be provided with strengthened the tolerance to bending loss even in a bending diameter in comparison with a conventional single mode fiber for the 1.3 μm band.

Accordingly, the present invention contributes to providing a low cost optical fiber with excellent dependability that is able to be laid with a small bending diameter or that allows surplus optical fiber to be stored in a small diameter, to say nothing of the arterial systems, in an access system, namely, in an office or inside the home.

What is claimed is:

1. An optical fiber comprising:

a core that has a substantially uniform first refractive index; and a cladding that is located outside the core and that has a substantially uniform second refractive index;

wherein an outer diameter of the core is in a range of 4.5 to 5 μm;

wherein a relative refractive index difference between the first refractive index and the second refractive index when the second refractive index is taken as a reference is in a range of 0.4 to 0.8%;

wherein a chromatic dispersion at a wavelength of 1550 nm is in a range of 2 to 6 ps/nm/km; and wherein an effective area at a wavelength of 1550 nm is 40 μm² or more.

2. The optical fiber according to claim 1, wherein the optical fiber has a mode field diameter (MFD) of 7.8 μm or greater at a wavelength of 1550 nm, and a bending loss of 0.3 dB/m or less at a tolerable bending diameter of 20 mm.

3. The optical fiber according to claim 2, wherein connection loss with a normal single mode optical fiber at ITU-T G.652 Recommendation is 0.35 dB or less at a wavelength of 1550 nm.

4. An optical transmission path comprising the optical fiber as claimed in claim 1.

5. The optical transmission path according to claim 4 further comprising a dispersion compensator that is combined with the optical fiber.

6. The optical fiber according to claim 1, wherein the relative refractive index difference is in a range of 0.4 to 0.5%; and wherein the effective area is 60 μm² or more.

7. The optical fiber according to claim 1, wherein transmission loss is 0.35 dB/km or less over a wavelength range from 1360 to 1400 nm.

8. The optical fiber according to claim 1, wherein transmission loss is 0.40 dB/km or less over a wavelength range from 1260 to 1625 nm.

9. The optical fiber according to claim 1, wherein the optical fiber comprises silica glass as a base material thereof.

10. The optical fiber according to claim 1, wherein the optical fiber has a two layer structure formed by the core and the cladding.

* * * * *